(12) United States Patent
Wickham et al.

(10) Patent No.: US 7,662,214 B1
(45) Date of Patent: Feb. 16, 2010

(54) DISPOSABLE ABSORBENT LINER FOR USE WITH REFRIGERATOR DRAWERS AND ASSOCIATED METHOD

(76) Inventors: Mark Wickham, 7 Madrona, Rancho Santa Margarita, CA (US) 92688; Lois Wickham, 7 Madrona, Rancho Santa Margarita, CA (US) 92688

( * ) Notice: Subject to any disclaimer, the term of this patent is extended or adjusted under 35 U.S.C. 154(b) by 90 days.

(21) Appl. No.: 11/906,700

(22) Filed: Oct. 3, 2007

Related U.S. Application Data

(60) Provisional application No. 60/849,605, filed on Oct. 6, 2006.

(51) Int. Cl.
*B01D 53/02* (2006.01)
(52) U.S. Cl. .............................. 95/117; 95/116; 62/334; 220/495.01; 220/495.03; 220/495.06; 220/495.07
(58) Field of Classification Search .................... 95/116, 95/117; 62/334; 220/495.01, 495.03, 495.06, 220/495.07
See application file for complete search history.

(56) References Cited

U.S. PATENT DOCUMENTS

| | | | |
|---|---|---|---|
| 4,120,417 A | 10/1978 | Aquino | |
| 5,046,604 A * | 9/1991 | Forhetz et al. | 206/5 |
| 5,944,706 A * | 8/1999 | Palumbo et al. | 604/368 |
| 6,173,580 B1 | 1/2001 | Rosenburg | |
| 6,305,567 B1 | 10/2001 | Sulpizio | |
| 6,565,169 B1 | 5/2003 | Moreno-Olquin | |
| 2003/0087086 A1* | 5/2003 | Koslow et al. | 428/323 |

* cited by examiner

*Primary Examiner*—Robert J Hill, Jr.
*Assistant Examiner*—Christopher P Jones

(57) ABSTRACT

A protective liner includes a body formed from disposable and porous material and has planar top and bottom surfaces respectively. Such a body is removably positioned within an existing refrigerator drawer such that the body covers an entire bottom surface of the existing refrigerator drawer. The body has an outer layer provided with a uniform thickness extending along the top and bottom surfaces respectively. Such an outer layer is formed from paper material and the core member is formed from cotton. The body further has a unitary core member intercalated between the outer layer and is statically nested therebetween. Such a core member is formed from water-absorbent material for soaking up and trapping moisture from the foodstuff.

2 Claims, 3 Drawing Sheets

DISPOSABLE ABSORBENT LINER FOR USE WITH REFRIGERATOR DRAWERS AND ASSOCIATED METHOD

CROSS REFERENCE TO RELATED APPLICATIONS

This application claims the benefit of U.S. Provisional Application No. 60/849,605, filed Oct. 6, 2006, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to absorbent liners and, more particularly, to disposable absorbent liners for absorbing moisture and assisting to maintain perishable foodstuff at a fresh state within a refrigerated environment.

2. Prior Art

For most people, household chores are a fact of life. Vacuuming debris from carpeting, polishing furniture, waxing floors and cleaning windows are necessary tasks which must be done regularly to ensure a healthy and clean household. In particular, keeping a clean kitchen is of utmost concern for many consumers. Because the kitchen is such a vital component of any home, most consumers take careful steps to make sure this room is clean and sanitary. Specifically, cleaning away spills and food debris from the interior of one's refrigerator is an important chore regularly completed by most household consumers. Most refrigerator shelving is comprised of rubber coated wire racks, as well as solid plastic shelves.

Providing ample space on which to store gallons of milk, condiments, and a host of other goods, shelving is integral to any refrigerator design. A crucial element of any refrigerator is the "crisper" drawers. Typically utilized to store fresh produce including a wide variety of fruits and vegetables, crisper drawers also provide ample storage for items such as luncheon meats, cheese and eggs. Although necessary, because of the very function of these drawers, ensuring they are clean and sanitary at all times can be problematic, especially given the fact that foods stored "out of sight" are often "out of mind" long past the expiration date. Simply stated, foods left within a crisper drawer for too long can quickly decompose, leaving behind a sticky and foul smelling liquid residue.

Let's face it, who hasn't opened a refrigerator crisper drawer when unpacking groceries, only to find the unpleasant reminder of forgotten peaches, lettuce or tomatoes purchased in the weeks before? Further, while the stench of rotten fruits and vegetables can be completely disgusting, those smells are only intensified when combined with the odor of spoiled meats and cheeses. Unfortunately, regardless of how well one maintains their household, it can be easy to forget the many food items which are stored away in a crisper drawer until the unpleasant, odoriferous reminder of their presence has seeped into the rest of the refrigerator, tainting other foods. Cleaning this sloppy residue can be a daunting task, particularly as the liquid matter which results from the food decomposition can become easily trapped within the grooves of the drawer, forming a crusty hard residue that is difficult to remove. Obviously, it would advantageous to provide a means for maintaining a clean and sanitary refrigerator drawer.

U.S. Pat. No. 4,120,417 to Aquino discloses a permanent, reusable, open skeletal-type crate that is permanently erect or collapsible. The crate is constructed to hold an inexpensive tray that is disposable. The tray in turn holds any desired number of individual containers of fluid or otherwise. In the preferred form the crate is collapsible and possesses hinged bottom end pieces that are slidable as allowed by a slot in a bottom strap. The erect crate may receive a tray holding the fluid or other containers with the crate and the tray constituting a system that is delivered to a retail outlet or alternatively the tray with its contents is deposited in the retail outlet. The crate has exceptional stacking strength with special corner posts. However, the crate is weak in the side to side direction and the end to end direction to eliminate uses that are prevalent with present milk crates. Unfortunately, this prior art example is not designed for refrigerator storage.

U.S. Pat. No. 6,173,580 to Rosenburg discloses a liner for a refrigerator crisper drawer. The liner comprises a main produce supporting body and provides drawer engaging surfaces. The main body provides a generally upwardly facing produce supporting surface on which items of produce can be placed and has a plurality of openings formed therethrough which enable fluids and air to flow through the main body. The supporting surfaces engage liner supporting surfaces inside the crisper drawer so as to support the items of produce in spaced relation above the floor of the crisper drawer and allow fluids and air to flow along the floor of the drawer beneath the produce supporting body, thereby allowing fluids to drain away from the items of produce through the openings and allowing chilled air within the crisper drawer to flow beneath the items of produce and generally upwardly through the openings to provide circulation to lower portions of the produce. The drawer engaging surfaces are constructed and arranged to enable the liner to be removed from the crisper drawer for cleaning or replacement. Unfortunately, this prior art example does not provide an odor eliminating mechanism.

U.S. Pat. No. 6,305,567 to Sulpizio discloses a protective insert for a drawer having a plurality of sidewalls which are interconnected by a bottom wall which is comprised of a generally continuous, generally tubular frame. The frame is formed of a plurality of interconnected, generally flat panels, the number of panels corresponding to the number of sidewalls of the drawer. Each of the frame panels is sized and shaped to conform to and to engage and cover at least a portion of an interior surface of the sidewalls of a corresponding one of the drawer. A flexible liner extends between each of the panels of the frame to engage and cover at least a substantial portion of the bottom wall of the drawer. In this manner, the frame retains the liner in place within the drawer such that the combination of the liner and the frame cover and protect at least a substantial portion of the interior surfaces of the drawer. In one embodiment, the frame is adjustable to fit drawers of different sizes and the liner is a sheet of polymeric material. In another embodiment, the frame is a predetermined, fixed size and the liner is a polymeric bag, which is secured to the frame. Unfortunately, this prior art example does not provide an odor eliminating mechanism.

Accordingly, the present invention is disclosed in order to overcome the above noted shortcomings. The present invention satisfies such a need by providing an apparatus that is convenient and easy to use, lightweight yet durable in design, and designed for absorbing moisture and assisting to maintain perishable foodstuff at a fresh state within a refrigerated environment. The present invention is simple to use, inexpensive, and designed for many years of repeated use.

BRIEF SUMMARY OF THE INVENTION

In view of the foregoing background, it is therefore an object of the present invention to provide an apparatus for absorbing moisture and assisting to maintain perishable foodstuff at a fresh state within a refrigerated environment. These and other objects, features, and advantages of the invention are provided by a disposable absorbent liner.

A protective liner includes a body formed from disposable and porous material and has planar top and bottom surfaces respectively. Such a body is removably positioned within an existing refrigerator drawer such that the body covers an entire bottom surface of the existing refrigerator drawer. The body has an outer layer effectively provided with a uniform thickness extending along the top and bottom surfaces respectively. Such an outer layer is formed from paper material and the core member is formed from cotton.

The body further has a unitary core member conveniently intercalated between the outer layer and is statically nested therebetween. Such a core member is formed from water-absorbent material for soaking up and trapping moisture from the foodstuff. The core member is homogenously impregnated with a cleaning agent for advantageously reducing bacteria growth within the existing refrigerator drawer. Such a cleaning agent includes baking soda. The core member has a uniform thickness that is greater than the thickness of the outer layer so that moisture uniformly soaks within the core member throughout a major surface area of the body, and the outer layer encapsulates the core member.

The protective liner body further includes left and right longitudinal sides equidistantly offset from a central axis effectively passing along an entire longitudinal length of the body so that the body evenly abuts an inner wall of the existing refrigerator drawer and effectively absorbs moisture over extended periods of time.

A method for absorbing moisture and assisting to maintain perishable foodstuff at a fresh state within a refrigerated environment includes the steps of: providing a first body formed from disposable and porous material that has planar top and bottom surfaces respectively. Such a first body has an outer layer provided with a uniform thickness extending along the top and bottom surfaces respectively, and further has a core member intercalated between the outer layer and is statically nested there between. Such a core member is formed from water-absorbent material for soaking up and trapping moisture from the foodstuff.

The steps further include: homogenously impregnated the core member with a cleaning agent for reducing bacteria growth within the existing refrigerator drawer; removably positioning the first body within an existing refrigerator drawer such that the first body covers an entire bottom surface of the existing refrigerator drawer; periodically monitoring the first body to determine whether the core member is fully saturated with moisture; if the core member is fully saturated, removably positioning a second body onto the first body and within the existing refrigerated drawer such that the first and second bodies become vertically stacked within the existed refrigerator drawer; and evenly abutting respective longitudinal sides of the first and second bodies against an inner wall of the existing refrigerator drawer for effectively absorbing moisture over extended periods of time.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
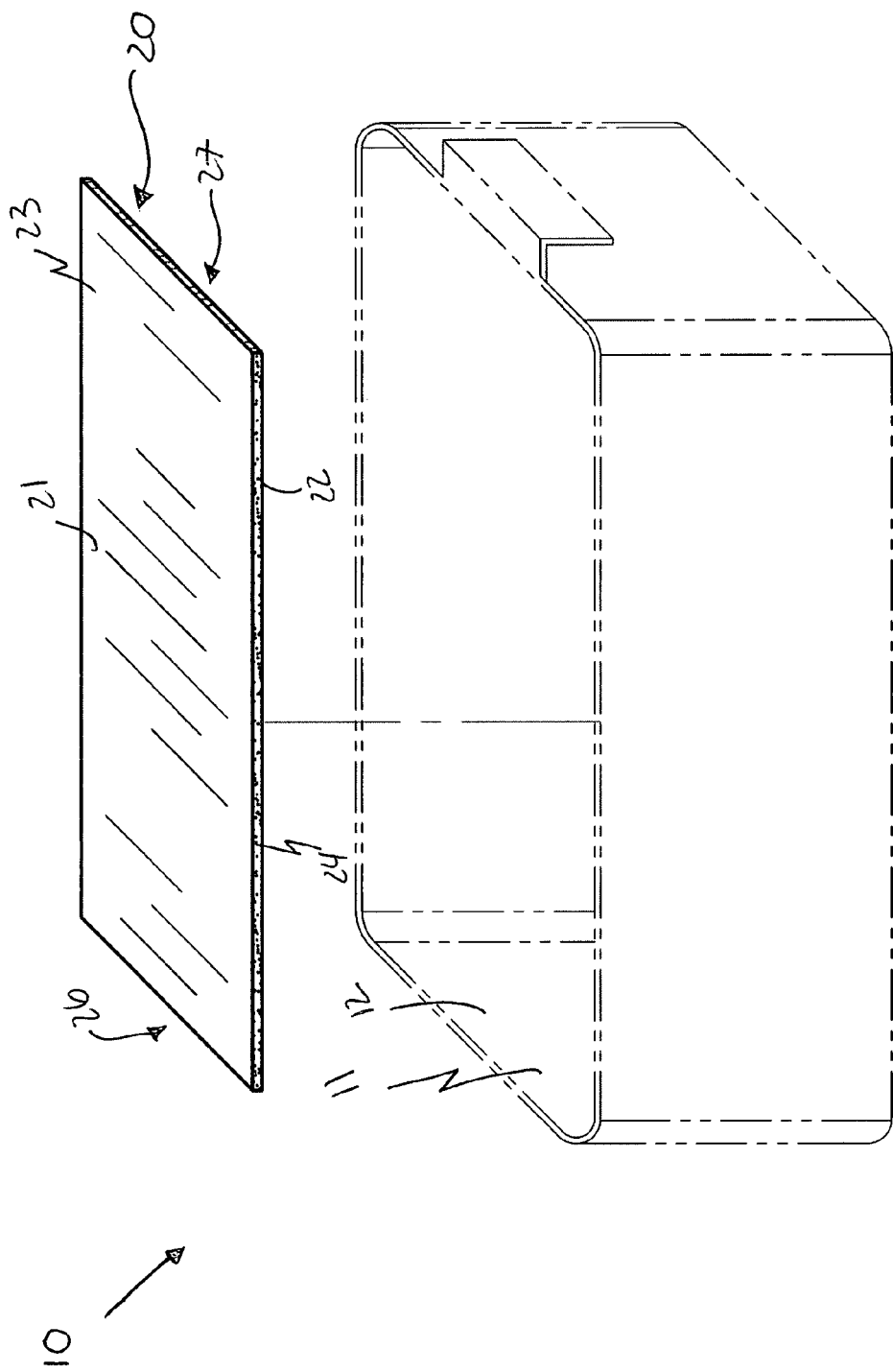
FIG. 1 is a perspective view showing a disposable absorbent liner in use with a refrigerator door, in accordance with the present invention.
Figure 2:
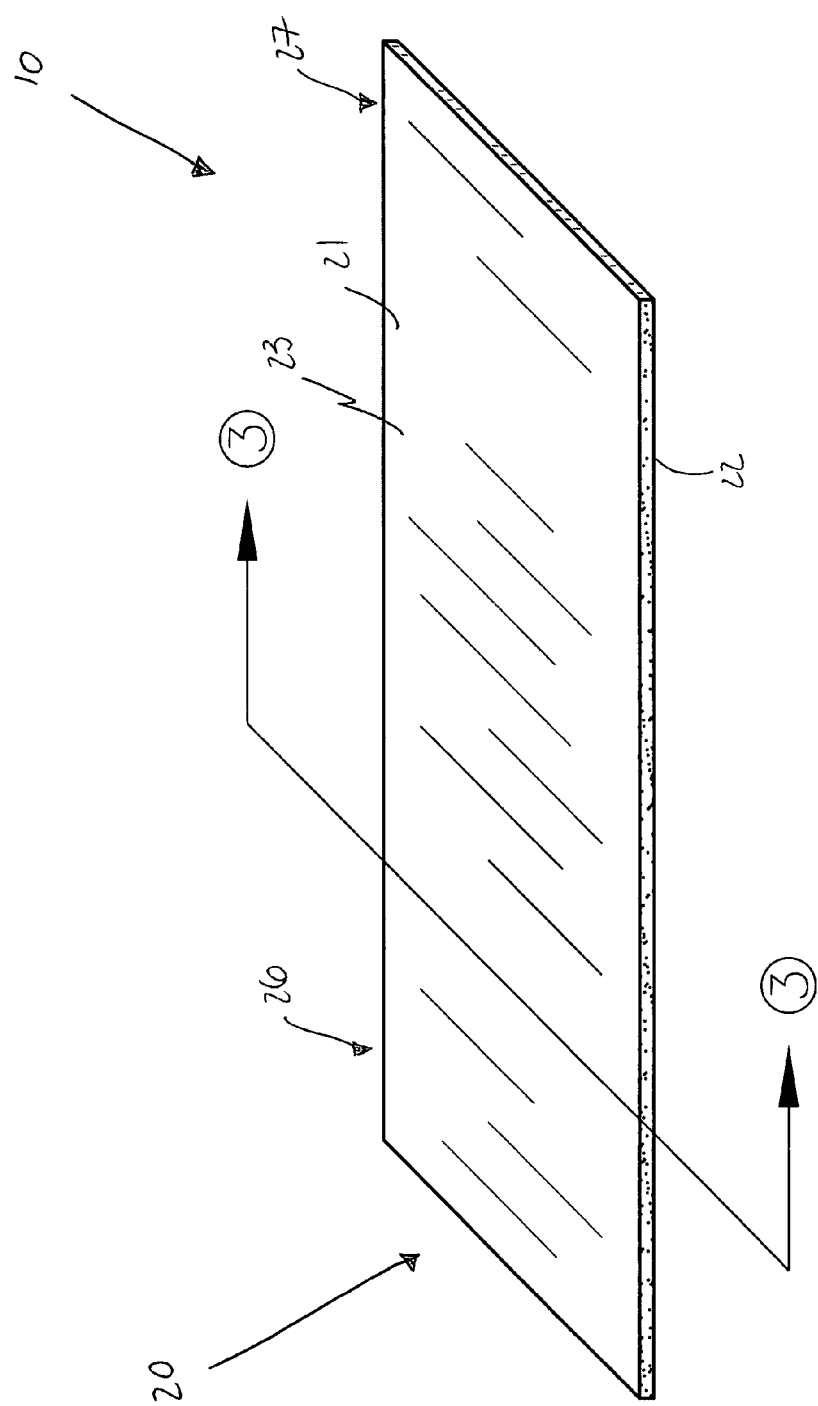
FIG. 2 is a perspective view of a disposable absorbent liner, in accordance with the present invention.
Figure 3:
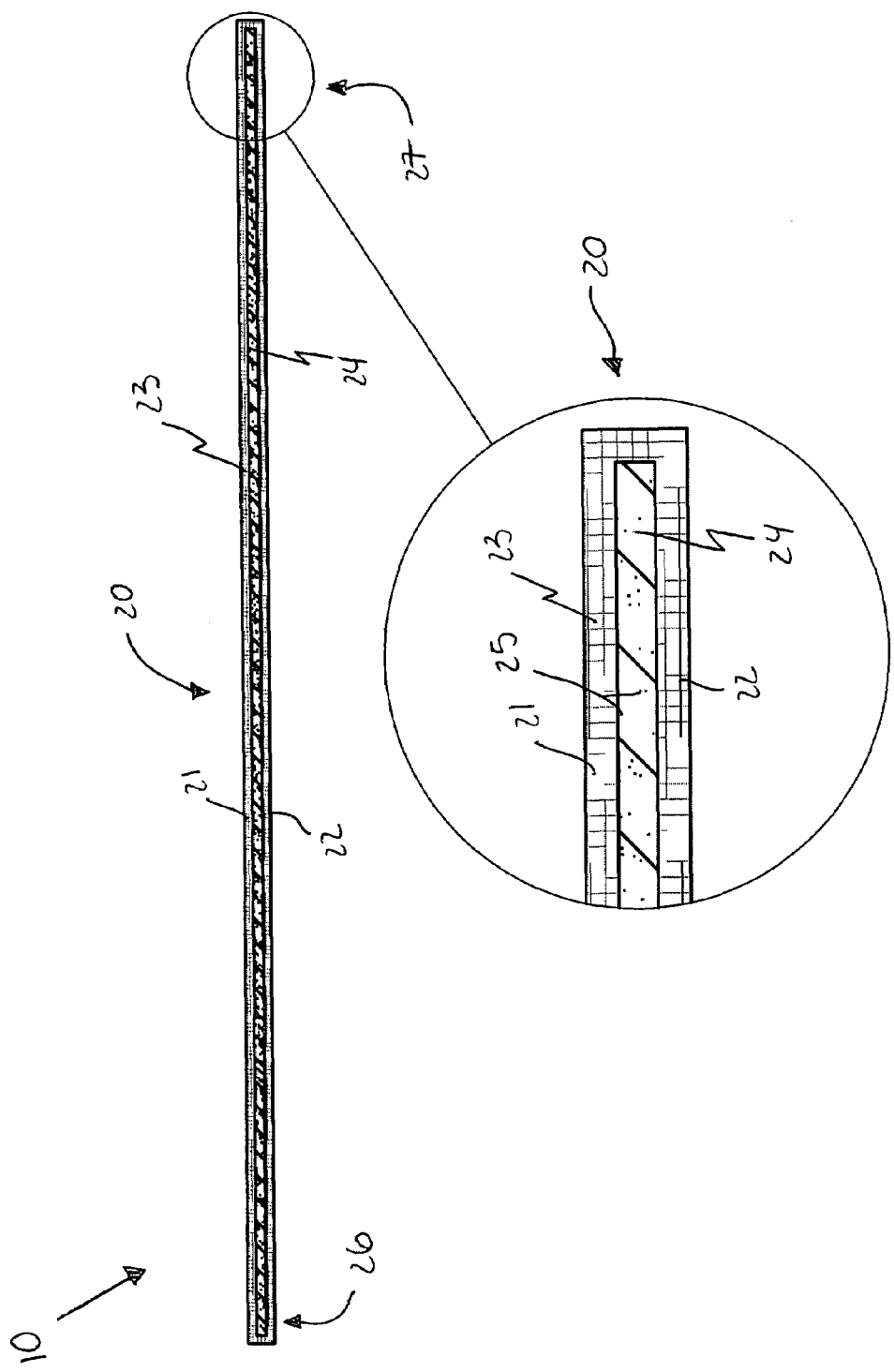
FIG. 3 is a cross sectional view, taken along line 3-3, as seen in FIG. 2.

The apparatus of this invention is referred to generally in FIGS. 1-3 by the reference numeral 10 and is intended to protect a disposable absorbent liner. It should be understood that the apparatus 10 may be used to protect many different types of storage containers and should not be limited in use to only those types of storage containers mentioned herein.

Referring to FIGS. 1, 2 and 3, a protective liner 10 includes a body 20 formed from disposable and porous material and has planar top and bottom surfaces 21, 22 respectively. Such a body 20 is removably positioned within an existing refrigerator drawer 11 which is essential such that the body 20 covers an entire bottom surface of the existing refrigerator drawer 11. The body has an outer layer 23 provided with a uniform thickness extending along the top and bottom surfaces 21, 22 respectively. Such an outer layer 23 is formed from paper material and a core member 24 is formed from cotton. The outer layer 23 is provided for preventing direct contact between food products and the core member 24.

Referring again to FIGS. 1, 2 and 3, the body 20 further has a unitary core member 24 intercalated between the outer layer 23 and is statically nested therebetween. Such a core member 24 is formed from water-absorbent material for soaking up and trapping moisture from the foodstuff. The core member 24 is homogenously impregnated with a cleaning agent 25 for reducing bacteria growth within the existing refrigerator drawer 11. Such a cleaning agent 25 includes baking soda. The core member 24 has a uniform thickness that is greater than the thickness of the outer layer 23 which is essential so that moisture uniformly soaks within the core member 24 throughout a major surface area of the body 20, and the outer layer 23 encapsulates the core member 24. The core member 24 absorbs liquid and odors that may be caused by the storage of food products.

Referring again to FIGS. 1, 2 and 3, the protective liner body 20 further includes left and right longitudinal sides 26, 27 equidistantly offset from a central axis passing along an entire longitudinal length of the body 20 which is vital so that the body 20 evenly abuts an inner wall 12 of the existing refrigerator drawer 11 and effectively absorbs moisture over extended periods of time.

The apparatus includes a disposable liner that is sized and shaped to fit within a refrigerator crisper drawer. Such a liner consists of a plurality of layers including an ultra-absorbent sanitary paper material layer, a tightly woven synthetic cotton layer, and a waterproof plastic bottom layer. The liner is substantially rectangular-shaped and measure approximately 14 inches in length, 11 inches in width and approximately ½-1 inch in total depth. Of course, the liner may be produced in a variety of alternate shapes and sizes for accommodating different drawer shapes, as is obvious to a person of ordinary skill in the art.

The disposable liner is further generously infused with odor absorbing baking soda, which is essential and advantageous for absorbing and trapping odors, effectively containing them within the liner and preventing them from escaping into the refrigerator. Of course, the disposable and absorbent liners can be sold in sheet form, in packages of six units or more per container, as is obvious to a person of ordinary skill in the art.

In use, the disposable and absorbent liner for use with refrigerator drawers and the like is simple and straight forward to operate. In a one step application, the user simply places a single liner within their refrigerator crisper drawer, making sure to position the unit so that it encompassed the entire bottom surface of the drawer. This process can also be repeated for any remaining drawers. The user then loads the drawers with produce, meats, cheeses and other fresh goods per usual, placing these items directly onto the liner. Once in place, the liner effectively and easily absorbs odors from foods stored on the liner, while also absorbing any moisture which may result from food decomposition or common household spills. Periodically, the user removes an old and soiled liner from the drawer, discards the soiled liner in any trash receptacle and replaces it with a fresh liner.

The present invention, as claimed, provides the unexpected and unpredictable benefit of a disposable absorbent liner that absorbs both odors and debris in a refrigerator drawer. The liner is ideal for preventing time-consuming cleaning procedures of a refrigerator. In addition, the liners are available in varying sizes to be used in differently sized drawers, or even on shelves. Such benefits overcome the prior art shortcomings.

The present invention provides an absorbent liner that is convenient and easy to use, lightweight yet durable in design, is inexpensive to produce, and provides users a simple and efficient means of maintaining a clean refrigerator. By completely encompassing any refrigerator crisper drawer, the absorbent liner effectively protects these storage receptacles from contact with liquid and solid debris. Preventing spilled beverages, bread crumbs, spoiled fruits and other debris from soiling the interior of the crisper, use of the apparatus allows consumers to quickly and easily clean their refrigerators. By providing an impenetrable barrier between the bottom of the drawers and goods stored within, the absorbent liner effectively prevents liquid and solid debris from pooling in the grooves of the drawer, thus ensuring that clean up is a breeze. Trapping the intense scents of onions, garlic, radishes and similar fare within the liner, use of this apparatus advantageously and effectively prevents the cross contamination of foods that so often occurs when stringent smelling items are stored along side goods such as breads, pastas and fruits. Furthermore, the disposable and absorbent liner is particularly useful in trapping those odors caused by spoiled or expired foods.

In use, a method for absorbing moisture and assisting to maintain perishable foodstuff at a fresh state within a refrigerated environment includes the steps of: providing a first body 20 formed from disposable and porous material that has planar top and bottom surfaces 21, 22 respectively. Such a first body 20 has an outer layer 23 provided with a uniform thickness extending along the top and bottom surfaces 21, 22 respectively, and further has a core member 24 intercalated between the outer layer 23 and is statically nested there between. Such a core member 24 is formed from water-absorbent material for soaking up and trapping moisture from the foodstuff.

In use, the steps further include: homogenously impregnated the core member 24 with a cleaning agent 25 for reducing bacteria growth within the existing refrigerator drawer 11; removably positioning the first body 20 within an existing refrigerator drawer 11 such that the first body 20 covers an entire bottom surface of the existing refrigerator drawer 11; periodically monitoring the first body 20 to determine whether the core member 24 is fully saturated with moisture; if the core member 24 is fully saturated, removably positioning a second body onto the first body and within the existing refrigerated drawer such that the first and second bodies become vertically stacked within the existed refrigerator drawer 11; and evenly abutting respective longitudinal sides of the first and second bodies against an inner wall 12 of the existing refrigerator drawer 11 for effectively absorbing moisture over extended periods of time.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A method for absorbing moisture and assisting to maintain perishable foodstuff at a fresh state within a refrigerated environment, said method comprising the steps of:

providing a first body formed from disposable and porous material and having planar top and bottom surfaces respectively, said first body having an outer layer provided with a uniform thickness extending along said top and bottom surfaces respectively, said first body further having a core member intercalated between said outer layer and being statically nested there between, said core member being formed from water-absorbent material for soaking up and trapping moisture from the foodstuff;

homogenously impregnating said core member with a cleaning agent for reducing bacteria growth within the existing refrigerator drawer;

removably positioning said first body within an existing refrigerator drawer such that said first body covers an entire bottom surface of the existing refrigerator drawer;

periodically monitoring said first body to determine whether said core member is fully saturated with moisture; and when said core member is fully saturated, removably positioning a second body onto said first body and within the existing refrigerated drawer such that said first and second bodies become vertically stacked within the existed refrigerator drawer.

2. The method of claim 1, further comprising the step of:

evenly abutting respective longitudinal sides of said first and second bodies against an inner wall of said existing refrigerator drawer for effectively absorbing moisture over extended periods of time.

* * * * *